United States Patent [19]

Ramchandran et al.

[11] Patent Number: 5,734,755
[45] Date of Patent: Mar. 31, 1998

[54] JPEG/MPEG DECODER-COMPATIBLE OPTIMIZED THRESHOLDING FOR IMAGE AND VIDEO SIGNAL COMPRESSION

[75] Inventors: Kannan Ramchandran, Champaign, Ill.; Martin Vetterli, Berkeley, Calif.; Yanbin Yu, New York, N.Y.; Dimitris Anastassiou, Tenafly, N.J.

[73] Assignee: The Trustees of Columbia University in the City of New York, New York, N.Y.

[21] Appl. No.: 212,430

[22] Filed: Mar. 11, 1994

[51] Int. Cl.⁶ .................................................. G06T 9/00
[52] U.S. Cl. ........................ 382/250; 358/432; 348/403
[58] Field of Search .......................... 382/56, 248, 250; 358/432, 433; 348/405, 403

[56] References Cited

U.S. PATENT DOCUMENTS

| | | | |
|---|---|---|---|
| 5,001,559 | 3/1991 | Gonzales et al. | 358/133 |
| 5,142,380 | 8/1992 | Sakagami et al. | 358/432 |
| 5,168,375 | 12/1992 | Reisch et al. | 358/432 |
| 5,243,419 | 9/1993 | Faryar et al. | 348/426 |
| 5,333,012 | 7/1994 | Singhal et al. | 348/405 |

OTHER PUBLICATIONS

Senoo et al., "Vector Quantization for Entropy Coding of Image Subbands," IEEE Transactions on Image Processing, vol. 1, No. 4, pp. 526–533, Oct. 1992.

Fandrianto et al., "A Programmable Solution for Standard Video Compression," COMPCON Spring 1992, pp. 47–50, Feb. 1992.

Ramchandran et al. "Best Wavelet Packet Bases in a Rate-Distortion Sense." IEEE Trans. Image Proc., vol. 2, No. 2, pp. 160–175, Apr. 1993.

Chou et al. "Optional Pruning With Applications to Tree-Structured Source Coding and Modeling" IEEE Trans. Info. Theory, vol. 35, No. 2, pp. 299–315, Mar. 1989.

Riskin, "Optimal Bit Allocation Via the Generalized BFOS Algorithm," IEEE Trans. Info. Theory, vol. 37, No. 2, pp. 400–402, Mar. 1991.

Sullivan et al. "Efficient Quadtree Coding of Images and Video," ICASSP91, vol. 4, pp. 2661–2664, Apr. 1991.

Wu et al. "Rate–Constrained Picture–Adaptive Quantization for JPEG Baseline Coders." ICASSP-93, vol. 5, pp. 389–392, Apr. 1993.

Rao et al. "On the Efficiency of Parallel Backtracking," IEEE Trans. on Parallel and Distributed Systems, vol. 4, No. 4, pp. 427–437, Apr. 1993.

"Coded Representation of Picture and Audio Information", Test Model 1, Draft Revision 1, Experts Group on ATM Video Coding, ISO–IEC/JTC1/SC29/WG11, CCITT SG XV, May 1992.

D. L. McLaren et al., "Removal of Subjective Redundancy from DCT–coded Images", IEE Proceedings–I, vol. 138, pp. 345–349 (1991).

C.-T. Chen, "Transform Coding of Digital Images Using Variable Block Size DCT with Adaptive Thresholding and Quantization", Proceedings of the SPIE, vol. 1349, Applications of Digital Image Processing XIII, pp. 43–54 (1990).

C.-T. Chen Chen et al., "A K–th Order Adaptive Transform Coding Algorithm for Image Data Compression", Proceedings of the SPIE, vol. 1153, Applications of Digital Image Processing XII, pp. 7–18 (1989).

Y.-Q. Zhang, "A Combined–Transform Coding (CTC) Scheme for Image Data Compression", IEEE Transactions of Consumer Electronics, vol. 37, pp. 972–977 (1991).

Y. Du, "Scene Adaptive Vector Quantization", Third International Conference on Image Processing and its Applications, IEE Conf. Publ. No. 307, pp. 571–575 (1989).

A. Baskurt et al., "Encoding the Location of Spectral Coefficients Using Quadtrees in Transform Image Compression", IEEE, ICASSP–89: 1989 International Conference on Acoustics, Speech and Signal Processing, vol. 3, pp. 1842–1845 (1989).

Y. B. Yu, "Variable Block Size and Position Transform Coding", Proceedings, EUSIPCO–88, Fourth European Signal Processing Conference, vol. 2, pp. 1011–1013 (1988).

D. K. Mitrakos et al., "Digital Image Compression with Fidelity Constraints", 1983 International Electrical, Electronics Conference Proceedings, IEEE, vol. 2, pp. 614–617 (1983).

Y. Shoham et al., Efficient Bit Allocation for an Arbitrary Set of Quantizers, IEEE Transactions of Acoustics, Speech, and Signal Processing, vol. 36 (1988), pp. 1445–1453.

*Primary Examiner*—Joseph Mancuso
*Assistant Examiner*—Jon Chang
*Attorney, Agent, or Firm*—Baker & Botts, L.L.P.

[57] ABSTRACT

For encoding signals corresponding to still images or video sequences, respective standards known as JPEG and MPEG have been proposed. These standards are based on digital cosine transform (DCT) compression. For economy of transmission, DCT coefficients may be "thresholded" prior to transmission, by dropping the less significant DCT coefficients. While maintaining JPEG or MPEG compatibility, threshold selection for the DCT coefficients of an image or video frame is based on optimizing for minimum distortion for a specified maximum target coding bit rate or, equivalently, for minimized coding bit rate for a specified maximum allowable distortion constraint. In the selection process, a dynamic programming method is used.

12 Claims, 5 Drawing Sheets

JPEG/MPEG DECODER-COMPATIBLE OPTIMIZED THRESHOLDING FOR IMAGE AND VIDEO SIGNAL COMPRESSION

The U.S. Government has certain rights in this invention under Contract CDR-881111 awarded by the National Science Foundation.

TECHNICAL FIELD

The invention relates to data compression in digital image and video signal processing.

BACKGROUND OF THE INVENTION

For digital coding of signals corresponding to still images or video sequences, respective standards known as JPEG and MPEG have been proposed; see "JPEG Technical Specification" Revision (Draft), Joint Photographic Experts Group, ISO-IEC/JTC1/SC2/WG8, CCITT SG VIII, August 1990 and "Coded Representation of Picture and Audio Information", Test Model 1, Draft Revision 1, Experts Group on ATM Video Coding, ISO-IEC/JTC1/SC29/WG11, CCITT SG XV, May 1992. These standards are based on digital cosine transform (DCT) compression. For economy of transmission, DCT coefficients may be "thresholded" prior to transmission, by dropping the less significant DCT coefficients. This involves use of a suitable criterion for determining significance.

The following are cited as background in the field of digital image and video technology:

U.S. Pat. No. 5,001,559, "Transform Coding Using Coefficient Prediction Techniques", issued Mar. 19, 1991 to C. A. Gonzales et al. discloses an encoding-decoding technique involving subdividing an image into blocks, transform coding of the image blocks to produce DC and AC coefficients., and recovery of the image from the coefficients of image blocks.

U.S. Pat. No. 5,142,380, "Image Data Processing Apparatus", issued Aug. 25, 1992 to K. Sakagami et al. discloses image data processing from memories for storing transform coefficients and threshold values. The ratios of transform coefficients to threshold values are quantized, a DC component is subtracted, zero values are detected and counted, and Huffman coding is applied.

The paper by D. L. McLaren et al., "Removal of Subjective Redundancy from DCT-coded Images", IEE Proceedings-I, Vol. 138, pp. 345-349 (1991) discloses thresholding of image transform coefficients, with each threshold chosen as large as possible subject to the requirement that no difference be perceived between an original and a reconstructed image.

The paper by C.-T. Chen, "Transform Coding of Digital Images Using Variable Block Size DCT with Adaptive Thresholding and Quantization", Proceedings of the SPIE, Vol. 1349, Applications of Digital Image Processing XIII, pp. 43-54 (1990) discloses thresholding and quantization applied to blocks of an image segmentation. The segmentation is optimized based on statistical, standard-deviation considerations.

The paper by C.-T. Chen et al., "A K-th Order Adaptive Transform Coding Algorithm for Image Data Compression", Proceedings of the SPIE, Vol. 1153, Applications of Digital Image Processing XII, pp. 7-18 (1989) discloses transform coding of an image, with compression parameters adapted to image contents.

The paper by Y.-Q. Zhang, "A Combined-Transform Coding (CTC) Scheme for Image Data Compression", IEEE Transactions of Consumer Electronics, Vol. 37, pp. 972-977 (1991) discloses image data compression by a so-called combined-transform coding technique in which image information is classified into a most significant portion and a less significant portion. Data compression is applied to the most significant portion as a whole. The less significant portion is segmented, and data compression is applied to the individual segments.

The paper by Y. Du, "Scene Adaptive Vector Quantization", Third International Conference on Image Processing and its Applications, IEE Conf. Publ. No. 307, pp. 571-575 (1989) discloses image encoding involving discrete cosine transform, classification, edge detection, spectral weighting, thresholding, spectrum partition, vector quantization, address coding, and scaler quantization.

The paper by A. Baskurt et al., "Encoding the Location of Spectral Coefficients Using Quadtrees in Transform Image Compression", IEEE, ICASSP-89: 1989 International Conference on Acoustics, Speech and Signal Processing, Vol. 3, pp. 1842-1845 (1989) discloses a transform image coding method applied to blocks, with thresholding based on statistical properties of the transform coefficients.

The paper by Y. B. Yu, "Variable Block Size and Position Transform Coding", Proceedings, EUSIPCO-88, Fourth European Signal Processing Conference, Vol. 2, pp. 1011-1013 (1988) discloses transform coding of image data with optimized determination of block boundaries by a dynamic programming technique.

The paper by D. K. Mitrakos et al., "Digital Image Compression with Fidelity Constraints", 1983 International Electrical, Electronics Conference Proceedings, IEEE, Vol. 2, pp. 614-617 (1983) discloses identification and exploitation of structure in data representing an image for optimized choice of encoding parameters by dynamic programming.

A still or video image frame may have 256×256 signal values or pixels, for example. For encoding, the frame may be subdivided into 32×32 "blocks", each having 8×8 pixels. Each one of the blocks is digitally encoded into DCT coefficients. Thresholding is applied to the DCT coefficients, and the thresholded coefficients are transmitted in accordance with a standardized sequence of the blocks, corresponding to a zigzag pattern on the image. With such standardization, JPEG and MPEG decoders have become popular, so that, desirably, any improved technique should remain compatible with these decoders.

SUMMARY OF THE INVENTION

While maintaining JPEG and MPEG compatibility, the DCT coefficients of an image or video frame are selected for rate-distortion optimality. Thus, distortion is minimized for a specified maximum target coding bit rate or, equivalently, coding bit rate is minimized for a specified maximum allowable distortion level. In a preferred selection process, a dynamic programming method is used.

DETAILED DESCRIPTION OF PREFERRED EMBODIMENTS

In preferred data compression, that subset of the DCT coefficients is retained which is most favorable in a rate-distortion (R-D) sense. At a marginal sacrifice of coded quality, a significant reduction in coding bit rate may then be realized, as fewer coefficients have to be transmitted. This applies especially when deciding on the last non-zero coefficient which, in JPEG and MPEG, is followed by an inexpensive end-of-block code.

In a preferred method, a fast recursive dynamic programming (DP) technique is used. Starting from the highest-quality point after quantization at a fixed scale in the case of JPEG, or at a fixed QP-level in the case of MPEG, the entire thresholding R-D curve can be swept over a continuous range of target bit rates or, equivalently, of target coding qualities by dropping insignificant coefficients in an image or video frame. Thus, all points on the convex hull of the thresholding R-D curve can be found. The method takes advantage of the monotonic nature of bit rate versus zero-run-length count preceding a non-zero coefficient inherent in the Huffman tables of JPEG and MPEG.

Figure 1:
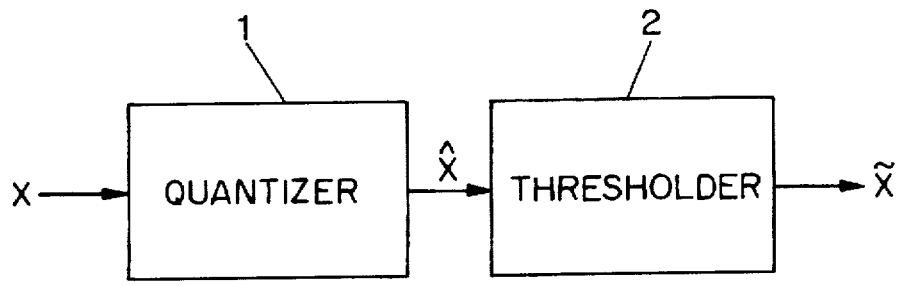
FIG. 1 is a block diagram of signal processing involving quantization and thresholding and of a corresponding processing system in accordance with preferred embodiments of the invention.

The following notation is helpful for further description, and also appears in FIG. 1 which shows a quantizer or coder 1 and a thresholder or optimizer 2:

X denotes a signal of interest, corresponding, e.g., to an 8×8 block of an image or video frame;

X^ denotes a DCT-quantized version of X corresponding to a fixed scale or "anchor" level representing the maximum quality operating point;

X^ denotes a desired thresholded version of X^;

D(x,y) denotes an appropriate distortion metric between signals x and y, such as mean-squared error (MSE) distortion, for example;

R(x) denotes the minimum bit rate required for transmission of a signal x; and $R_{budget}$ denotes the maximum target bit rate.

Sought is X^-, having a quantized version which is the same as the quantized version of X, namely X^, and such that $$D(X,X^-) \text{ is minimized subject to } R(X^-) \leq R_{budget}$$

This constrained optimization problem can be converted into a corresponding unconstrained problem with a "Lagrange multiplier", λ. The task then becomes minimization of the function J(λ) defined by $$J(\lambda)=D(X,X^-)+\lambda \cdot R(X^-)$$

Advantageously, the optimal coefficient search for the image can be performed independently for each 8×8 image block for the fixed quality "slope" λ, which trades-off distortion for rate. This is because, at R-D optimality, all blocks must operate at the same slope point λ on their R-D curves; see the paper by Y. Shoham et al., "Efficient bit allocation for an arbitrary set of quantizers", IEEE Transactions on Acoust., Speech, Signal Proc., Vol. 36 (1988), pp. 1445-1453.

In the present example of an 8×8 block, optimization is over the corresponding set of 64 coefficients. Thus, if T={0, 1, 2, ..., 63} is the set of DCT coefficient indices of the 8×8 block, ordered in the standard zigzag scan order, if S⊆T denotes any feasible ordered subset of T, and if D(S) and R(S) denote the distortion and the bit rate, respectively, associated with retaining the coefficients in S, the task of finding $$D_{min}=\min_{S \subseteq T} D(S) \text{ subject to } R(S) \leq R_{budget}$$

is accomplished upon defining $$J(\lambda)=D(S)+\lambda \cdot R(S)$$

representing the Lagrangian cost of S associated with the quality factor λ, and finding $$J_{min}(\lambda)=\min_S J(\lambda)=\min_S (D(S)+\lambda \cdot R(S))$$

The desired, initially unknown optimal value λ* for λ depends on the particular target budget or quality constraint. This value can be obtained readily by a convex search using the bisection method:

$$J_{min}(\lambda^*)=\max_{\lambda \geq 0}(J_{min}(\lambda)-\lambda \cdot R_{budget})$$

For an exposition of the bisection method, see, e.g., the paper by K. Ramchandran et al., "Best Wavelet Packet Bases in a Rate-Distortion Sense", IEEE Transactions on Image Processing, Vol. 2, pp. 160-173 (1993).

Figure 2:
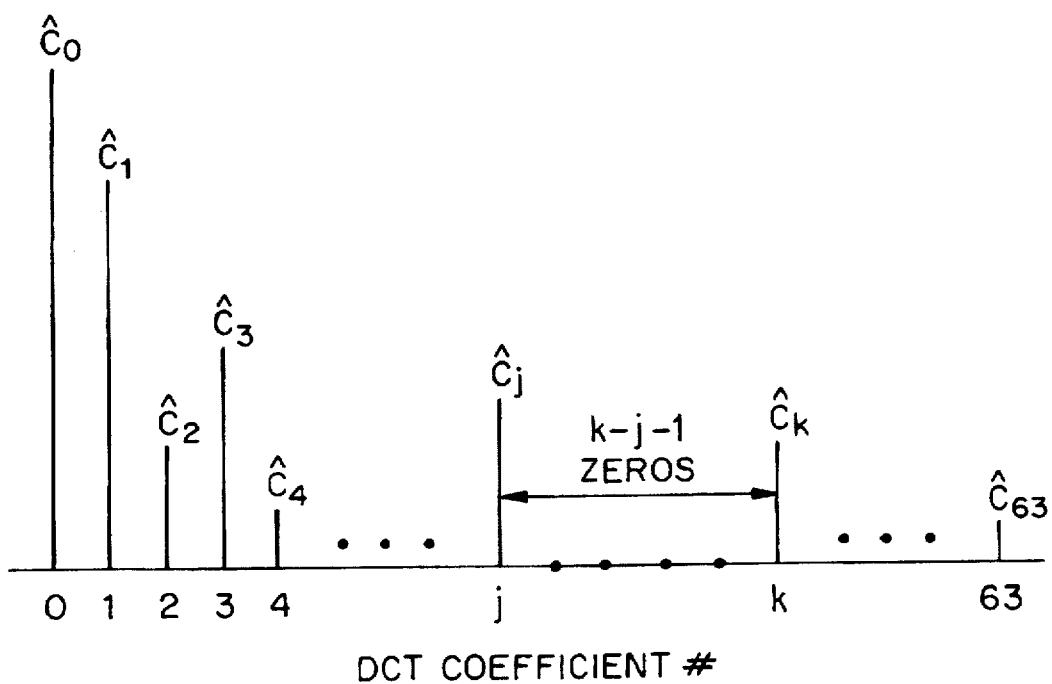
FIG. 2 is a graphic representation of DCT coefficients for a typical 8×8 image block of JPEG/MPEG, linearly ordered according to the zigzag scan order.

Since, as described above, the optimal convex-hull solution can be found by finding the minimum-Lagrangian-cost operating point, i.e., one which minimizes $$J=D_{block}+\lambda^* \cdot R_{block}$$

for each block of the sequence independently, consideration of a single block is sufficient. In a preferred embodiment, the zigzag scan that is part of the JPEG and MPEG standards is used to order the 2-D DCT coefficients. As an initialization, the $\Delta J_{j,k}$'s are determined which are associated with the incremental Lagrangian cost of going from coefficient j directly to coefficient k, i.e., of dropping all the intermediary coefficients, for all non-zero valued (j,k)-coefficient pairs with j<k. $\Delta J_{j,k}=-E_k+\lambda \cdot R_{j,k}$ represents the "net gain" of including $C^{\wedge}_k$ conditioned on the previous non-thresholded coefficient being $C^{\wedge}_j$. $E_k$ represents the "goodness" or quality measure as calculated by the decrease in squared error caused by retaining $C^{\wedge}_k$, and is given by $C_k^2-(C_k-C^{\wedge}_k)^2$, where $C_k$ and $C^{\wedge}_k$ are the unquantized and quantized coefficient values, respectively, and $R_{j,k}$ is the conditional bit rate in coding coefficient $C^{\wedge}_k$ given that the previous non-zero coefficient is $C^{\wedge}_j$, i.e., $R_{j,k}$ is the conditional cost of retaining $C^{\wedge}_k$. For illustration, see FIG. 2. $C^{\wedge}_0$ is the DC coefficient.

Figure 3:
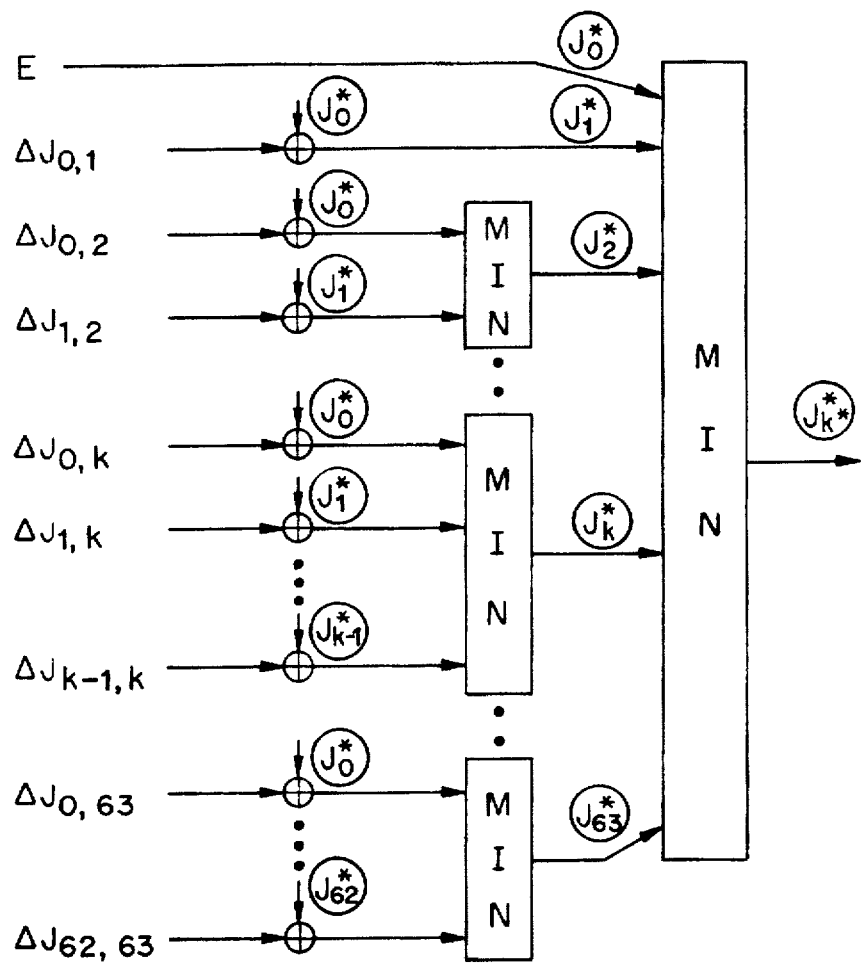
FIG. 3 is a block diagram of dynamic programming recursion in accordance with a preferred embodiment of the invention, applied to an 8×8 image block.

The values $R_{j,k}$ can be prestored from the JPEG and MPEG standard Huffman coding tables; see, e.g., the above-referenced JPEG and MPEG references. Only the run lengths need to be stored, not the actual Huffman coded bit stream, so that little memory is required. The optimal operating point, for a fixed value of $\lambda$, can be found in a recursive fashion by finding first the minimum Lagrangian cost $J*(k)$ and then the optimal predecessor coefficient, "predecessor(k)", associated with choosing coefficient $C^{\wedge}_k$ as the last non-zero coefficient for all k=1, 2, . . . , 63. Then, starting from that coefficient k* which is the least costly to retain as the last non-zero coefficient, i.e., minimum $J*(.)$, the optimal set can be "backtracked" from the optimal predecessor chain calculated for all predecessors of k*. See FIG. 3 for illustration.

A more detailed step-by-step description of the method follows. The recursion begins with coefficient 0. The cost of dropping all AC coefficients is stored as $J*(0)$. Then, the minimum-cost "path" that ends in coefficient 1 is selected. There is no choice in this, as there is only one path that ends in coefficient 1, namely dropping all coefficients from 2 to 63. This cost is saved as $J*(1)$, and the optimal predecessor to 1 is 0. Proceeding to coefficient 2, the most efficient recursive way of determining the best path that ends in 2 is to find the optimal predecessor to 2, i.e. either 0 or 1. Since the optimal costs associated with ending at 0 or 1 are known from $J*(0)$ and $J*(1)$, respectively, the task of finding the least costly path ending in 2 amounts to finding the minimum of $J*(0)+\Delta J_{0,2}$ (where $\Delta J_{0,2}$ is the incremental cost of going from 0 to 2), and $J*(1)+\Delta J_{1,2}$. The smaller of these two costs is saved as $J*(2)$, and the optimal predecessor of 2, i.e., the one among 0 or 1 which resulted in the smaller total cost leading to 2, is saved as predecessor(2). Proceeding similarly to coefficient 3, the best path ending in 3 must have a direct predecessor which is either 0, 1 or 2. As the best costs associated with ending at all predecessors are known from previous iterations and are stored as J*(predecessor), and as the incremental cost of going from each predecessor to "3" is known from the precomputed $\Delta J_{predecessor, 3}$ for all predecessors 0, 1 and 2, the best path ending in 3 is computed as the least of the total costs J*(predecessor)+$\Delta J_{predecessor, 3}$ for all predecessors 0, 1 and 2. The least cost is saved as $J*(3)$, the optimal predecessor is saved as predecessor(3), and the recursion continues to coefficient 4 and so on until the last coefficient 63 is processed. At this point, the optimal last non-zero coefficient k* is the one with the smallest $J*(k)$ for k=0, 1, . . . , 63. Backtracking from k* now yields the optimal predecessor chain sequence starting from predecessor(k*) and going back to 0, at which point the entire optimal set of coefficients to be retained for the block is known, for the given $\lambda$.

Figure 4:
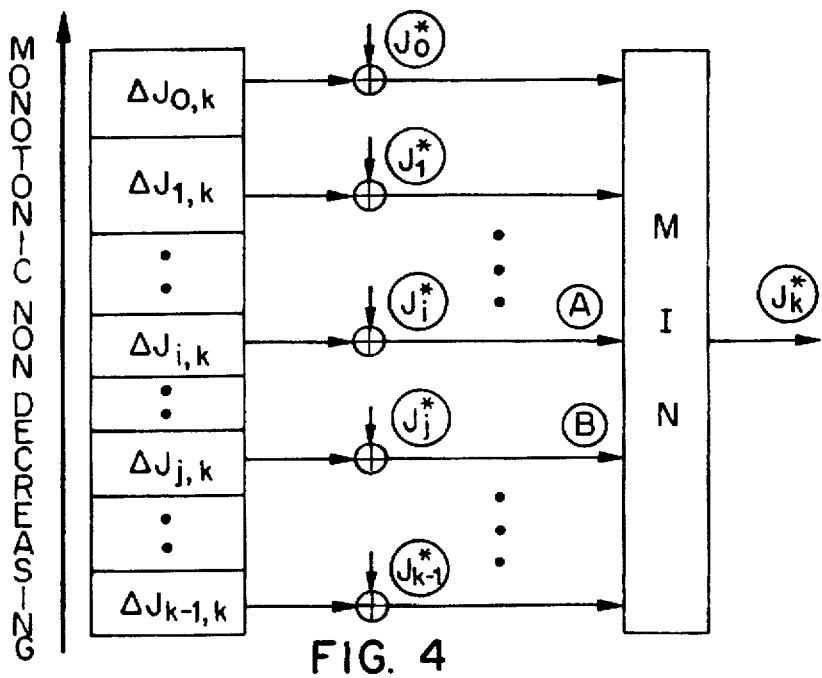
FIG. 4 is a schematic which illustrates dropping or pruning of DCT coefficients in accordance with a preferred embodiment of the invention.

Generally, in finding the optimal predecessor at a particular iteration k as described above, all coefficients j<k have to be considered as candidates. However, for the particular case of monotonicity of $R_{j,k}$ in the zero-run-length count (k−j−1), which is the case for the default coding tables of JPEG and MPEG, a "fast pruning" method can be used to speed up the search. This results in a substantial decrease in computational complexity, and leads to a fast optimal method. See FIG. 4 for illustration.

Optimal dynamic programming is performed independently on each one of the blocks. The composite R-D point for the picked $\lambda$ is then obtained as the sum of the optimally obtained R-D points for each block for that value of $\lambda$. Finally, the optimal slope $\lambda*$ which solves the desired budget or quality constraint is found using a fast convex search.

A preferred method is illustrated further in terms of method steps listed below, in Phase I for a fixed operating slope $\lambda$ for a single typical 8×8 image block. Phase I is applied independently and preferably in parallel to each signal block to determine the optimal coefficient sequence to be retained for that block. Included in Phase I, through Step 6, is a determination of the optimal last coefficient to be retained as a non-zero coefficient. This coefficient has the index k*. Then, starting at Step 7, the entire optimal set of coefficients is produced as {optset}. In Phase II, the optimal operating slope $\lambda*$ for the composite problem is obtained.

A one-time fixed cost of gathering the required statistics is incurred as described above with reference to FIG. 2. This involves gathering, for each DCT coefficient $C^{\wedge}_k$, its thresholding distortion $E_k$ and its conditional non-thresholding coding cost $R_{j,k}$ conditioned on every preceding non-zero coefficient j<k.

In the method described by steps below, E denotes the total unquantized AC energy in the signal block, i.e., $E=\rho_{k=1}^{63} C_k^2$. $E_k$ denotes the thresholding distortion associated with coefficient k. $R_{j,k}$ denotes the incremental bit rate cost of coding k after j, $\Delta J_{j,k}$ denotes the incremental Lagrangian cost of including k after j, $J_k*$ is the minimum Lagrangian cost associated with having k as the last non-zero coefficient, and $S_k$ is the set of all candidate optimal predecessor coefficients to k. See FIG. 3 for further illustration.

Phase I: Finding the Optimal Coefficient Set for a $\lambda$-value.

Finding the Optimal Last Coefficient.

Step 1. Compute $\Delta J_{i,j} \leftarrow -E_j + \lambda \cdot R_{i,j}$ for all non-zero coefficient pairs i,j with j>i Step 2. (Initialization) k*←0; k←0; $S_0*\leftarrow\{0\}$; $J_0*\leftarrow E$; predecessor(0)←nil Step 3. k←k+1; if k=63, go to Step 7; otherwise continue with Step 4

Step 4. If $E_k=0$, set $S_k \leftarrow S_{k1}$ and go to Step 3; otherwise continue with Step 5

Step 5. $J_k* \leftarrow \min_{i \in S(k-1)}(J_i* + \Delta J_{i,k})$; if $J_k* \leq J_{k*}*$, then k*←k Step 6. $S_k \leftarrow \{k\} \cup \{i | i \in S_{k-1}$ and $J_i* < J_k*\}$; predecessor(k) $\leftarrow \min^{-1}_{i \in s(k-1)}(J_i* + \Delta J_{i,k})$; go to Step 3

Backtracking to Find the Optimal Coefficient Set.

Step 7. Initialize the set of optimal coefficients as optset←{k*}; set k←k*

Step 8. If predecessor(k)=nil, then go to Step 10; otherwise, continue with Step 9

Step 9. Get the optimal predecessor to k and include its membership in the set {optset}:

{optset}←{optset}∪{predecessor(k)}; go to step 8

Step 10. DONE. The optimal solution of coefficients to be retained for the given $\lambda$ is the set {optset}.

An important operation that ensures a fast algorithm is the pruning action in Step 6. This step eliminates from candidacy for predecessor to the next non-zero coefficient, all those prior coefficients whose lowest cost of retaining as the last non-zero coefficient exceeds that of the current iteration's coefficient. Thus, if the current coefficient produces the lowest cost so far, it is the only candidate for predecessor to the next non-zero coefficient. This is due to the monotonic nature of the bit-rate versus zero-run-length Huffman tables for JPEG and MPEG, where the cost of coding a non-zero coefficient is monotonically non-decreasing in the length of the zero-run preceding that coefficient.

Phase II: Finding the Optimal Operating Slope.

The optimal value $\lambda^*$ which solves a desired budget constraint $R_{budget}$ is found using a convex-search bisection algorithm. Starting from a known initial interval encompassing the desired operating slope, the search intervals are made successively smaller, exploiting the convex relationship of both global rate and global distortion with respect to the operating slope $\lambda$, until convergence is achieved. If $\lambda_l^{(i)}$ and $\lambda_u^{(i)}$ are the lower and upper bounds to $\lambda^*$ at iteration i, then the convexity property is exploited in tightening either the upper bound or the lower bound at the (i+1)th iteration to $\lambda^{(i+1)} = |(\Delta D/\Delta R)^{(i)}|$, where this ratio of the difference in distortion and rate associated with the slopes $\lambda_l^{(i)}$ and $\lambda_u^{(i)}$ of the i-th iteration provides a closer approximation to $\lambda^*$ than the one available at the i-th iteration.

In the exemplary method, Phase II may be implemented as an "outer loop" for block-by-block processing. However, as mentioned above, parallel processing is preferred. In either case, Phase I is invoked for each value of $\lambda$ put forth by Phase II, for converging values of $\lambda$ for a block. The value of $\lambda^*$ solves the budget Constrained problem to within a convex hull approximation.

Figure 9:
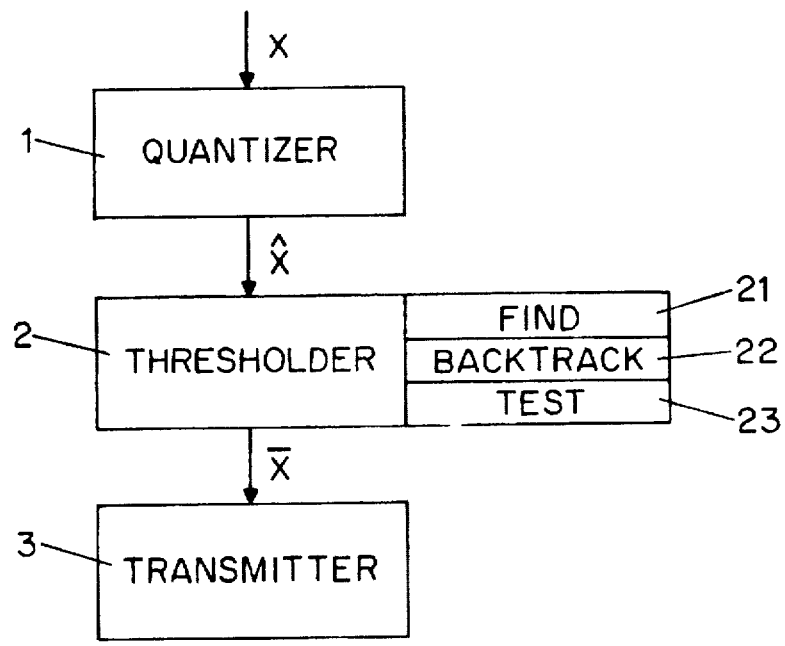
FIG. 9 is a block diagram of a signal processing system in accordance with a preferred embodiment of the invention.

In a systems implementation in accordance with a preferred embodiment as shown in FIG. 9, Phases I and II are implemented in the optimizer or thresholder 2. The thresholder 2 receives the quantized input signal $X^\wedge$ from the coder or quantizer 1. These are as in FIG. 1.

Steps 1-6 of Phase I are implemented in the thresholder 2 in a finder 21, and steps 7-10 in a backtracker 22. A stopping criterion for Phase II is implemented in the thresholder 2 in a tester 23, e.g., based on the size of the difference between current upper and lower bounds for $\lambda^*$. The final subset $X^\sim$ of $X^\wedge$ goes to a transmitter 3.

The method of Phase I can also be used independently, without Phase II, e.g., for "sweeping" through values of $\lambda$. For example, Phase I can be used to quantify the benefits of adaptive thresholding applied to the JPEG and MPEG coding environments, as R-D curves are obtained by sweeping the Lagrange multiplier $\lambda$ through all positive values for typical quantization scales of interest.

Figure 5:
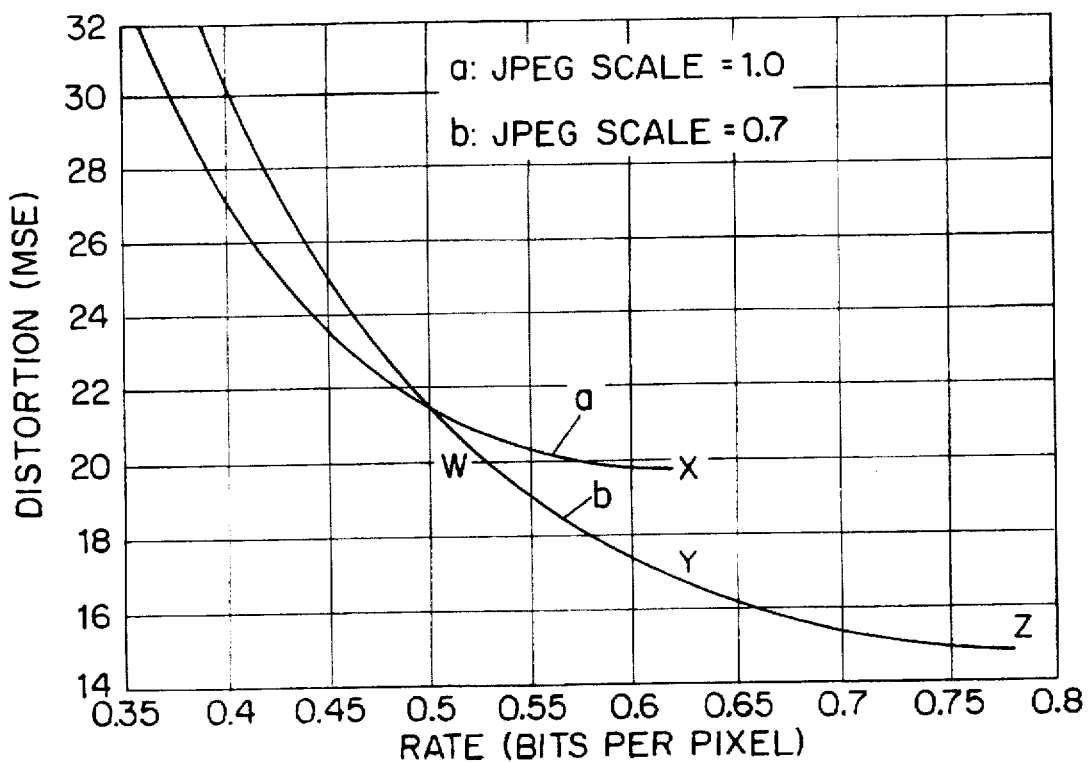
FIG. 5 is a graphic representation of distortion as a function of bit rate for two different JPEG scales, for an image as in FIGS. 7a and 7b.

FIG. 5 shows the R-D curves for a typical image using JPEG for pre-thresholding quantization scales of 1.0 for curve (a), and of 0.7 for curve (b). Point X on curve (a) is the unthresholded "reference" obtained for a scale of 1.0. First, with the bit rate fixed at the reference's bit rate of 0.615 bits per pixel (bpp): for the finer scale of 0.7, the non-thresholded bit rate, corresponding to point Z, is greater than that of X. With optimal thresholding, however, the bit budget constraint imposed by curve (a) is satisfied, and an adaptive thresholding gain in terms of increased SNR for the same bit rate is realized. Thus, point Y has a 0.7 dB gain at the same bit rate over X. Alternatively, with the PSNR fixed according to that of X (37.15 dB): point W has a compression advantage at the same PSNR of approximately 15%.

Figure 6:
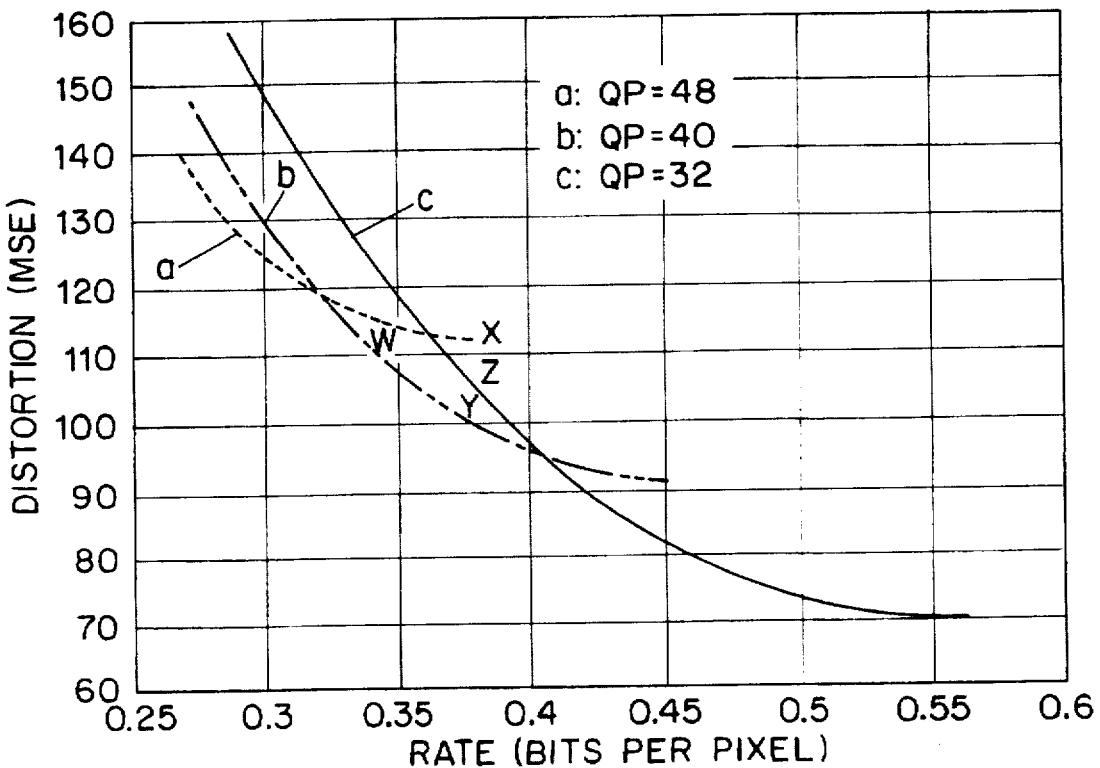
FIG. 6 is a graphic representation of distortion as a function of bit rate for three different QP levels in MPEG, for an intraframe coded test frame.

FIG. 6 also shows optimal thresholding R-D curves, for an intra-frame coded frame of the "mit" test sequence and using an MPEG intra-frame code book. Curve (a) corresponds to a QP level of 48, curve (b) to a finer quantizer QP level of 40, and curve (c) to a still finer QP level of 32. If the reference is fixed at point X on curve (a) corresponding to a QP of 48, point Y can be reached by "backing off" to the finer QP=40 and thresholding optimally to point Y at the same bit rate as X. For this example, with reference X, the thresholding gain at point Y is approximately 0.52 dB at a bit rate of 0.377 bpp. Alternatively, at the same MSE of 112.5, a 12% reduction in bit rate is realized at point W of curve (b). If point Z on curve (c) with QP=32 were chosen, a lesser coding gain of approximately 0.26 dB would be realized over point X.

In experiments, it was found that "backing off" to a finer quantization scale and thresholding optimally until the same reference bit rate or PSNR is achieved as an unthresholded coarser quantized version resulted in an appreciable coding gain. However, as illustrated by FIG. 6, there was an optimal back-off point beyond which the performance started to degrade. Thresholding after starting with a finer quantization scale is inadvisable beyond a point, as the gain of representing the non-thresholded coefficients with less distortion is no longer outweighed by dropping entire coefficients, since for fine quantization scales, there is not much distortion to begin with.

Figure 7A:
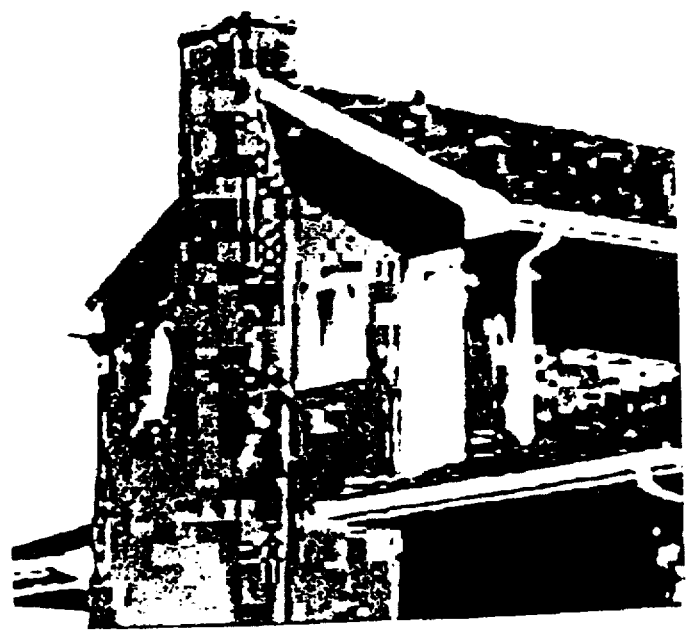
FIG. 7a is an image of a house, transmitted without thresholding.
Figure 7B:
FIG. 7b is an image of the same house, transmitted with thresholding in accordance with a preferred embodiment of the invention.

Coding results obtained from performing optimal thresholding on typical images and video sequence frames used in the image processing community revealed a coding gain of about 0.5-1 dB, or about 12-15% bit rate compression improvement while retaining complete decoder compatibility. Subjectively, optimal thresholding appears as most beneficial in the case of low to medium bit rate coding, as illustrated by FIGS. 7a and 7b. FIG. 7a shows as a non-thresholded reference a standard "House" image coded with JPEG using a quantization scale of 3.0. The thresholded version using a scale of 2.0 is shown in FIG. 7b. The coding gain is 0.8 dB, and the subjective quality is improved. An intuitive reason lies in that, for low bit rate applications, it is preferable to represent the low frequency coefficients with maximum fidelity while dropping the expensive high frequency coefficients. This gives a smoother but less noisy image, which is best possible at low bit rates. Thus, adaptive thresholding can take the place of noise shaping or low pass filtering without any external processing and without affecting the decoder.

Figure 8:
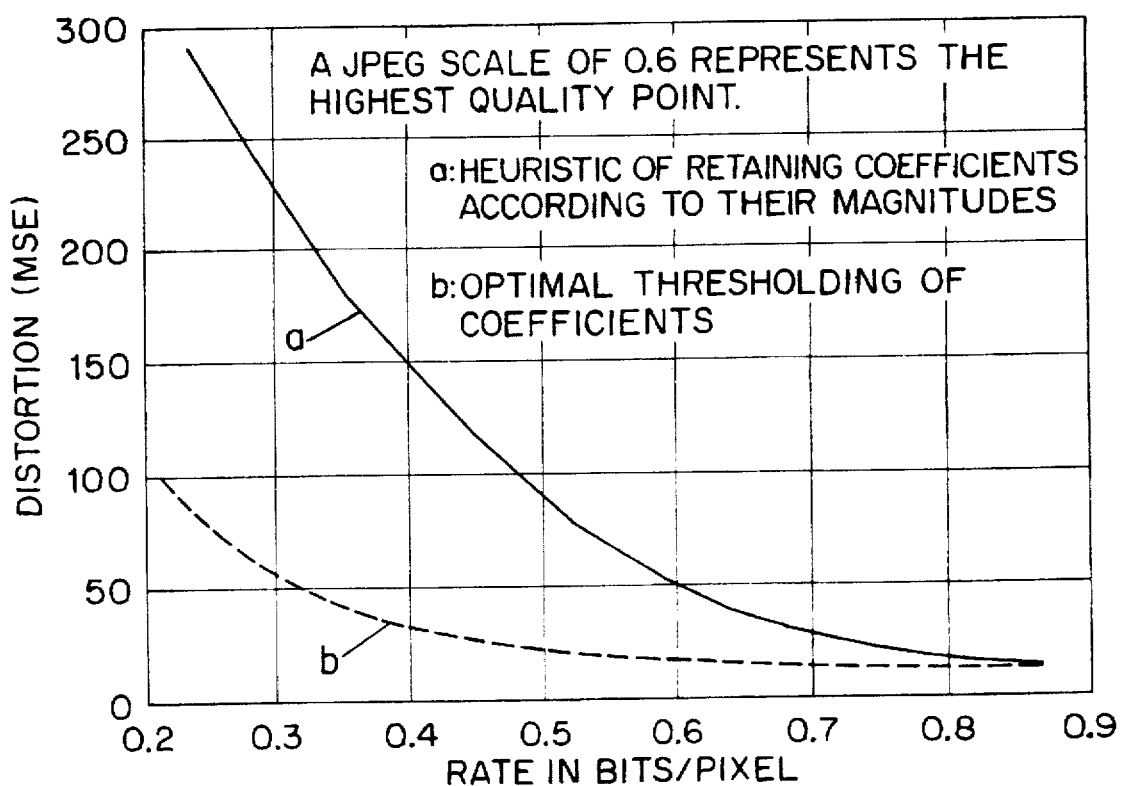
FIG. 8 is a graphic representation of distortion as a function of bit rate for thresholding in accordance with a preferred embodiment of the invention, as compared with thresholding by retaining the largest coefficients in a block.

The performance of the optimal algorithm was compared with a simple-minded heuristic method that retains for each block the k DCT coefficients which are largest in magnitude. FIG. 8 shows that considerable gain can be realized by using an optimal method, namely more than 5 dB for bit rates below 0.6 bpp. At 0.52 bpp, the gain is approximately 5.6 db.

While the above is a description of the invention in preferred embodiments, various modifications, alternatives and equivalents may be employed, only some of which have been described above. For example, preferred processing can be applied to image or video frames which may be partitioned in other ways than into 8×8 blocks. Also, instead of simple mean-squared error, another suitable distortion metric can be used, e.g., to take subjective measures into account. Thus, for example, activity-weighted mean-squared error can be used. Yet other variations will be apparent to those skilled in the art.

We claim:

1. A method for signal compression in image transmission, comprising:

transform coding to obtain an ordered set, T, of JPEG transform coefficients for at least a portion of an image;

repeatedly, for different values of a parameter, $\lambda$, selecting an ordered subset, $S_\lambda$, of the set T of transform coefficients, selection of each ordered subset $S_\lambda$ being such that, for $S=S_\lambda$, a function $$J(\lambda) = D(S) + \lambda \cdot R(S)$$

is minimized over all subsets S of the set T of transform coefficients, wherein D(S) is a measure of image distortion resulting from retaining the subset S as compared with the set T, and wherein R(S) is a minimum bit rate required for transmission of the subset E, repetition being terminated with $\lambda=\lambda^*$ upon at least approximate leaching of rate-distortion optimality as determined by a function $$J_{min}(\lambda) - \lambda \cdot R_{budget}$$

being maximized over $\lambda \geq 0$, wherein $J_{min}(\lambda)$ is the minimized value of the function $J(\lambda)$ and wherein $R_{budget}$ is a predetermined maximum target bit rate; and transmitting the finally selected, JPEG compatible subset of transform coefficients over a communications channel.

2. The method of claim 1, wherein repetition is terminated when the difference between a member of a monotonically non-increasing sequence of upper bounds and a member of a monotonically non-decreasing sequence of lower bounds for $\lambda^*$ is less than a predetermined amount.

3. The method of claim 1, wherein selecting the subset $S_\lambda$ of transform coefficients comprises (i) finding a last transform coefficient of the subset, and (ii) backtracking to find all transform coefficients preceding the last coefficient.

4. A system for signal compression in image transmission, comprising:

coding means for transform coding to obtain an ordered set, T, of JPEG transform coefficients for at least a portion of an image;

optimization means for repeatedly, for different values of a parameter, $\lambda$, selecting an ordered subset, $S_\lambda$, of the set T of transform coefficients, selection of each ordered subset $S_\lambda$ being such that, for $S=_\lambda$, a function $$J(\lambda) = D(S) + \lambda \cdot R(S)$$

is minimized over all subsets B of the set T of transform coefficients, wherein D(S) is a measure of image distortion resulting from retaining the subset S as compared with the set T, and wherein R(S) is a minimum bit rate required for transmission of the subset S, repetition being terminated with $\lambda=\lambda^*$ upon at least approximate reaching of rate-distortion optimality as determined by a function $$J_{min}(\lambda) - \lambda \cdot R_{budget}$$

being maximized over $\lambda \geq 0$, wherein $J_{min}(\lambda)$ is the minimized value of the function $J(\lambda)$ and wherein $R_{budget}$ is a predetermined maximum target bit rate; and transmission means for transmitting the finally selected, JPEG-compatible subset of transform coefficients over a communications channel.

5. The system of claim 4, wherein the optimization means comprises means for terminating the repetition when the difference between a member of a monotonically non-increasing sequence of upper bounds and a member of a monotonically non-decreasing sequence of lower bounds for $\lambda^*$ is less than a predetermined amount.

6. The system of claim 4, wherein the optimization means comprises first means for finding a last transform coefficient of the subset $S_\lambda$, and second means for backtracking to find all transform coefficients preceding the last coefficient.

7. A method for signal compression in image transmission, comprising:

transform coding to obtain an ordered set, T, of MPEG transform coefficients for at least a portion of an image of a video sequence;

repeatedly, for different values of a parameter, $\lambda$, selecting an ordered subset, $S_\lambda$, of the set T of transform coefficients, selection of each ordered subset $S_\lambda$ being such that, for $S=S_\lambda$, a function $$J(\lambda) = D(S) + \lambda \cdot R(S)$$

is minimized over all subsets S of the set T of transform coefficients, wherein D(S) is a measure of image distortion resulting from retaining the subset S as compared with the set T, and wherein R(S) is a minimum bit rate required for transmission of the subset S, repetition being terminated with $\lambda=\lambda^*$ upon at least approximate reaching of rate-distortion optimality as determined by a function $$J_{min}(\lambda) - \lambda \cdot R_{budget}$$

being maximized over $\lambda \geq 0$, wherein $J_{min}(\lambda)$ is the minimized value of the function $J(\lambda)$ and wherein $R_{budget}$ is a predetermined maximum target bit rate; and transmitting the finally selected, MPEG-compatible subset of transform coefficients over a communications channel.

8. The method of claim 7, wherein repetition is terminated when the difference between a member of a monotonically non-increasing sequence of upper bounds and a member of a monotonically non-decreasing sequence of lower bounds for $\lambda^*$ is less than a predetermined amount.

9. The method of claim 7, wherein selecting the subset $S_\lambda$ of transform coefficients comprises (i) finding a last transform coefficient of the subset, and (ii) backtracking to find all transform coefficients preceding the last coefficient.

10. A system for signal compression in image transmission, comprising:

coding means for transform coding to obtain an ordered set, T, of MPEG transform coefficients for at least a portion of an image of a video sequence;

optimization means for repeatedly, for different values of a parameter, $\lambda$, selecting an ordered subset, $S_\lambda$, of the set T of transform coefficients, selection of each ordered subset $S_\lambda$ being such that, for $S=S_\lambda$, a function $$J(\lambda) = D(S) + \lambda \cdot R(S)$$

is minimized over all subsets S of the set T of transform coefficients, wherein D(S) is a measure of image distortion resulting from retaining the subset S as compared with the set T, and wherein R(S) is a minimum bit rate required for transmission of the subset s, repetition being terminated with $\lambda=\lambda^*$ upon at least approximate reaching of rate-distortion optimality as determined by a function $$J_{min}(\lambda) - \lambda \cdot R_{budget}$$

being maximized over $\lambda \geq 0$, wherein $J_{min}(\lambda)$ is the minimized value of the function $J(\lambda)$ and wherein $R_{budget}$ is a predetermined maximum target bit rate; and transmission means for transmitting the finally selected, MPEG-compatible subset of transform coefficients over a communications channel.

11. The system of claim 10, wherein the optimization means comprises means for terminating the repetition when the difference between a member of a monotonically non-increasing sequence of upper bounds and a member of a monotonically non-decreasing sequence of lower bounds for $\lambda^*$ is less than a predetermined amount.

12. The system of claim 10, wherein the optimization means comprises first means for finding a last transform coefficient of the subset $S_\lambda$, and second means for backtracking to find all transform coefficients preceding the last coefficient.

* * * * *